May 27, 1952 — G. JACKSON — 2,598,551
TEMPERATURE INDICATING UNIT
Filed May 6, 1946

Gordon Jackson
Inventor

By Joe E. Edwards
Attorney

Patented May 27, 1952

2,598,551

UNITED STATES PATENT OFFICE 2,598,551

TEMPERATURE INDICATING UNIT

Gordon Jackson, Denver, Colo., assignor to Eastman Oil Well Survey Company, Denver, Colo., a corporation of Delaware Application May 6, 1946, Serial No. 667,703

3 Claims. (Cl. 73—344)

This invention relates to new and useful improvements in temperature indicating units.

One object of the invention is to provide an improved indicating unit for measuring and indicating the temperature within an oil well bore, whereby the temperature thereof may be visually indicated.

An important object of the invention is to provide an improved unit for measuring and indicating temperature which is constructed so that it may be readily combined with a photographic type of a well survey instrument, whereby the indication given by said unit may be photographically recorded and a permanent record thereby obtained.

Still another object of the invention is to provide an improved temperature measuring and indicating unit which is preferably a unitary assembly which may be combined with an ordinary well survey instrument without changing the construction of said instrument, whereby said instrument may be used with or without said unit as desired; the assembly being so constructed that when in its connected position, its indicating element and dial overlie the other usual indicating elements of the survey instrument, which permits the temperature indicator to be photographed simultaneously with and on the same photographic record as the other indicating elements of the survey instrument.

A further object of the invention is to provide an improved temperature unit of the character described, which is preferably a separate unit but which, if desired, may be an integral part of the well survey instrument; the unit being extremely simple in construction and involving only a single bi-metallic indicating element which is responsive to the temperature of the well bore within which the unit is lowered.

The construction designed to carry out the invention will be hereinafter described together with other features of the invention.

Figure 1:
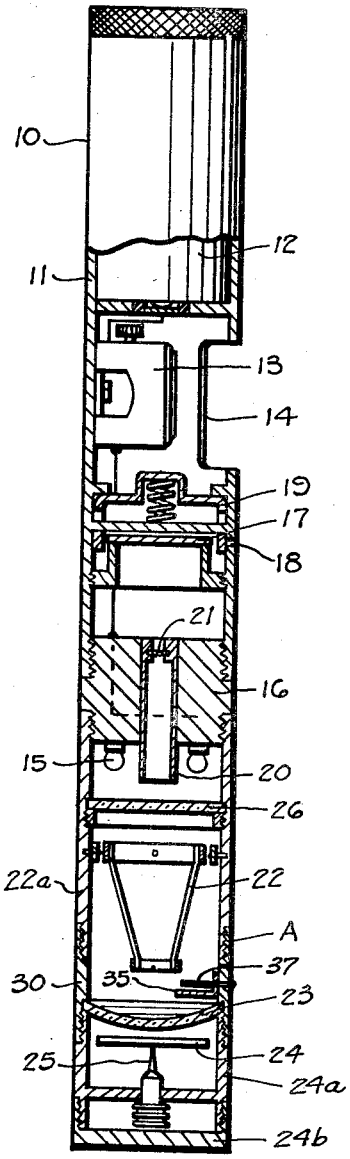
Figure 2:
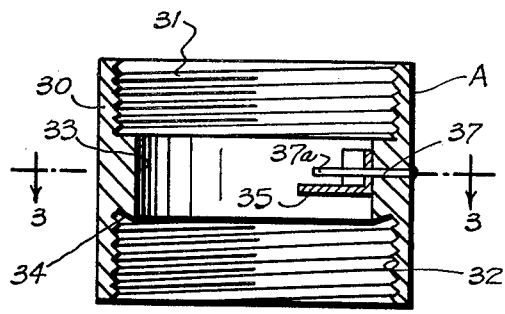
Figure 3:
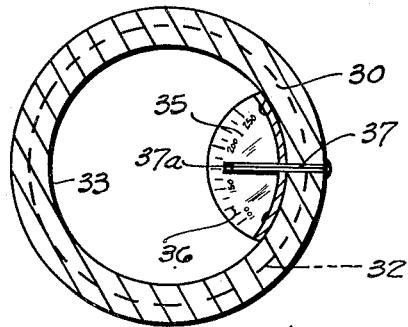
Figure 4:
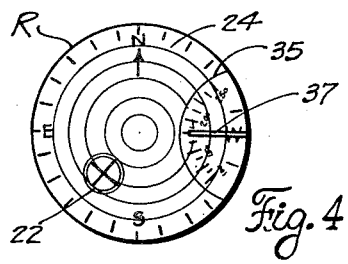

The invention will be more readily understood from a reading of the following specification and by reference to the accompanying drawing, wherein an example of the invention is shown, and wherein:

Figure 1 is a view, partly in section and partly in elevation of an ordinary well survey instrument having a temperature unit, constructed in accordance with the invention, combined therewith, Figure 2 is an enlarged, sectional detail of the temperature unit, Figure 3 is a horizontal, cross-sectional view taken on the line 3—3 of Figure 2, and, Figure 4 is a plan of the photographic record which is obtained by the device.

In the drawings, the numeral 10 designates an ordinary photographic type of well survey instrument. This instrument includes a tubular casing or housing 11 which has a battery section 12 in its upper end. A watch or timing mechanism 13 is mounted within the casing and is accessible through a slot 14 in one side of the instrument housing. The watch or timing mechanism may be properly set to control the closing of an electrical circuit to electric lamps 15 which are mounted within an adapter 16 threaded into the lower portion of the housing. A photographic disk 17 which is constructed of photographic film is adapted to be inserted into position within the housing through a loading slot 18, the opening and closing of said slot being controlled by a depressible closure member 19 which is mounted within the housing and which has its upper end accessible through the opening 14 for manual operation.

When the photographic disk 17 is in position within the housing, it is disposed axially above a camera lens tube 20 which is mounted axially within the adapter 16. A suitable lens 21 is mounted in the upper portion of the lens tube 20. When the watch or timing mechanism 13 closes the electrical circuit to the lamps 15, said lamps are illuminated to expose the photographic film 17 and thereby photograph the object or objects which are located below the lens tube 20. The construction of this portion of the instrument 10 is well known in the art of well surveying and many instruments, known as "single shot" well survey instruments are now in general use.

The usual single shot instrument includes an inclination indicator, which is shown as a plumb bob 22. The plumb bob overhangs a concentric ring glass 23 which has a plurality of concentric rings, indicative of degrees of inclination displayed thereon. Below the glass 23 is a magnetic compass 24 mounted upon a suitable pivot 25, said compass being located in the extreme lower end of the instrument 10.

Since the plumb bob 22 and compass 24 are located below the lens tube 20, it will be obvious that when the electric lamps 15 are illuminated, an image of the plumb bob and compass will be photographed on the photographic disk 17. The chamber in which the plumb bob 22 is mounted is closed by a transparent cover glass element 26 whereby extraneous dirt or other matter is prevented from falling into the plumb bob chamber. It is noted that the plumb bob and compass arrangement shown in the drawing is substantially the same as that used in the usual "single shot" well surveying instrument.

In many wells it is desirable to obtain information concerning the temperature of the well and ordinarily it is necessary to run a separate temperature recording instrument for this purpose. In carrying out the present invention a temperature measuring and indicating unit A is arranged to be combined with the well survey instrument 10. As is clearly shown in Figure 2 this unit includes an annular body or collar 30 which has internal threads 31 at its upper end adapted to be connected with the lower end of the plumb bob housing 22a; the plumb bob housing has its upper end connected to the lower portion of the adapter 16. The lower portion of the collar 30 has internal threads 32 which are arranged to be connected with the compass housing 24a and the lower end of said compass housing has an end cap 24b threaded thereon. The central portion of the collar 30 has an inwardly directed annular flange 33 and the lower portion of said flange is undercut at 34, this undercut shoulder being adapted to engage the upper peripheral edge portion of the concentric ring glass 23 when the unit A is coupled to the compass housing 24a.

A transparent arcuate dial member 35 is suitably secured to the inner surface of the flange 33 and is provided with a scale or graduations 36 which are representative of degrees of temperature. A bi-metallic indicating element 37 is mounted within the wall of the collar 30 and has its indicating end 37a overlying the dial member 35. Since the element 37 is constructed of bi-metallic or thermostatic metal it will be responsive to temperature changes and such changes will cause movement of the indicating end 37a over the scale 36 to indicate the temperature. Since the dial member 35 is transparent, it will not interfere with the image of the compass 24 which is located therebelow and thus when a photograph is taken on the disk 17, the plumb bob and compass will be photographed in the usual manner and in addition, an image of the dial member 35 and indicating end 37a of the indicating element 37 will appear. The record R obtained is clearly shown in Figure 4 and from this record, information as to degree of inclination, direction of such inclination and also temperature of the well bore is obtained.

In the operation of the instrument, the timing mechanism 13 is set to allow a sufficient lapse of time to permit lowering of the instrument to a desired elevation within the well bore. Upon reaching the position at which a photograph is to be taken, the temperature responsive element 37 will be affected by the temperature and will move into a position overlying the transparent dial member 35 to indicate the degrees of temperature. The timing mechanism then functions to close the electrical circuit to the lamps 15, whereby the photographic film disk 17 is exposed and images of the plumb bob, compass and temperature indicator are produced on the single disk. The instrument is then brought to the surface and upon development of the film, the record shown in Figure 4 is obtained.

It will be apparent that a very simple type of temperature recorder is provided. The unit A is a separate assembly which may be connected in the usual well survey instrument and thereby provide temperature information in addition to the inclination and direction. If it is not desired to employ the unit, it is only necessary to remove the collar 30 from its connection between the plumb bob housing and the compass housing and substitute a connecting collar therefor. In some instances, it may be desirable to form the indicator 37 and its dial element 35 as an integral part of a well survey instrument. In such case, the dial element, as well as the indicator may be permanently attached to the inner wall of the plumb bob housing. Although the unit has been illustrated as employed with a single type of survey instrument, it is pointed out that it may be employed with any other photographic type of survey instrument, such as the usual multiple shot machines which take a series of pictures on 16 mm. film.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A temperature measuring and indicating unit adapted to be connected in the housing of a well survey instrument comprising, an annular body having an axial bore extending therethrough, a dial member secured to the inner wall of the body and projecting into the bore thereof, and a temperature responsive element having one end secured in the body and its inner end extending into the bore in overlying relation to the dial member.

2. A temperature measuring and indicating unit adapted to be connected in the housing of a well survey instrument comprising, an annular body having an axial bore extending therethrough, a dial member secured to the inner wall of the body and projecting into the bore thereof, said dial member being transparent and having a general arcuate shape with a temperature scale displayed thereon, and a temperature responsive element having one end secured in the body and its inner end extending into the bore and overlying the transparent dial so as to be movable with respect to the scale thereon in accordance with temperature conditions.

3. A temperature measuring and indicating unit as set forth in claim 2, wherein the temperature responsive element is constructed of bi-metal.

GORDON JACKSON.

REFERENCES CITED

The following references are of record in the file of this patent:

UNITED STATES PATENTS

| Number | Name | Date |
|---|---|---|
| 1,762,859 | Gebhard | June 10, 1930 |
| 1,898,473 | Williston et al. | Feb. 21, 1933 |
| 1,925,223 | Ahlburg | Sept. 5, 1933 |
| 2,098,476 | Webster | Nov. 9, 1937 |
| 2,235,252 | Bradley | Mar. 18, 1941 |